Figure 1:
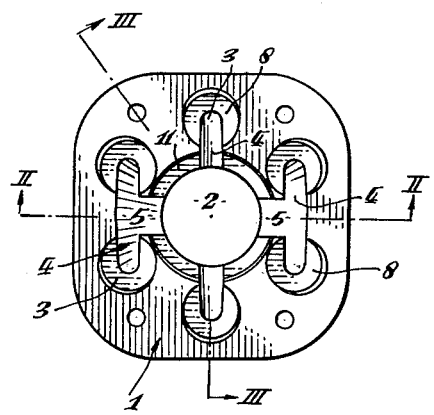

Aug. 14, 1962     J. T. C. HARVEY     3,048,907
MEANS FOR SECURING WIRES OR RODS IN THE STRESSED CONDITION
Filed Jan. 23, 1959     3 Sheets-Sheet 1

INVENTOR
John Terence Crawford Harvey
By
Watson, Cole, Grindle & Watson
ATTORNEYS Aug. 14, 1962   J. T. C. HARVEY   3,048,907
MEANS FOR SECURING WIRES OR RODS IN THE STRESSED CONDITION
Filed Jan. 23, 1959   3 Sheets-Sheet 2

INVENTOR
John Terence Crawford Harvey
By
Watson, Cole, Grindle & Watson
ATTORNEYS Aug. 14, 1962 J. T. C. HARVEY 3,048,907
MEANS FOR SECURING WIRES OR RODS IN THE STRESSED CONDITION
Filed Jan. 23, 1959 3 Sheets-Sheet 3

INVENTOR
John Terence Crawford Harvey
By
Watson, Cole, Grindle & Watson
ATTORNEYS United States Patent Office 3,048,907
Patented Aug. 14, 1962

3,048,907
MEANS FOR SECURING WIRES OR RODS IN THE STRESSED CONDITION
John Terence Crawford Harvey, Frimley, near Aldershot, England, assignor to Intercontinental Equipment Co., Incorporated, New York, N.Y.
Filed Jan. 23, 1959, Ser. No. 788,610
Claims priority, application Great Britain Feb. 7, 1958
6 Claims. (Cl. 24—122.6)

This invention relates to anchoring means, for securing in a stressed condition, reinforcing wires or rods used in the construction of pre-stressed concrete structures. The expressions "wire" or "rod" as used herein are intended to include not only mono-wires or mono-rods several of which may be used to form a bunch, but also multi-wires of multi-rods made up from a plurality of small wires which may be spiralled together in the manner of a steel rope.

Anchoring means for such a purpose are known in the prior art and comprise a block having apertures through the thickness thereof which are so disposed that their longitudinal axes converge towards one another, each said aperture providing a passage through which the free end of a rod or wire can pass and means cooperating with the block for securing each rod or wire in the stressed condition, the said securing means for each rod or wire being located relative to the associated rod or wire by the aperture through which that rod or wire passes. The concrete structure to be prestressed has to be provided with a tapered guide which is inset into the concrete and which forms a conduit for the wires or rods as well as a thrust face for the block. The wires or rods are passed through a passage within the concrete and also passed through this tapered guide. The ends of the wires or rods will initially be bunched together where they emerge from the wider end of the tapered sleeve and it is then necessary to spread them and to position each individual wire or rod through the appropriate aperture in the block. This is not always an easy operation to perform, since each individual wire or rod must both be opened out from the bunch and threaded through its appropriate aperture. The opening out of the wires or rods from the bunch is usually achieved by wedging them apart until each of them is approximately in the correct position for threading through the block. The apertures in the block are of tapered formation to accommodate complementary securing collets which hold each wire or rod. With this known construction when it is desired to increase or reduce the tension in any one of the said wires or rods it is not always easy to remove the collets from the block without disturbing the other wires or rods in the bunch. The main object of the present invention is to overcome the above disadvantages by providing an improved individual anchoring means.

According to the present invention there is provided an anchorage guide for the purpose set forth comprising a member of tubular form one end of which comprises the main aperture to receive the bunched wires or rods emerging from the concrete, while the other end includes a number of subsidiary apertures grouped around the main aperture and communicating therewith by slots which converge inwardly and merge with the wall of the bore of the main aperture intermediate the ends of the said member so that individual wires may, after being separated from the bunch, be moved into the said slots and each located in one of the said subsidiary apertures and secured therein by the action of a collet and associated bush or other securing means.

The invention also includes an anchorage guide for the purpose set forth comprising a member of tubular form tapered externally and adapted to be set into the concrete with its larger end outermost, a main bore in said member extending from a single inner main aperture to a central outer main aperture and adapted for the passage of a bunch of stressing wires or rods; a plurality of subsidiary apertures grouped around the outer main aperture, and each communicating with the main bore by subsidiary bores inclined at an angle to the main bore; slots in the wall of the main bore communicating with each subsidiary bore, whereby after a bunch of wires has been passed through the main bore, individual rods or wires may be separated and spread, so as to occupy the several subsidiary bores, each subsidiary aperture being adapted to receive a collet and associated bush or other locking device to secure a rod or wire therein after stress has been applied to it. The invention also contemplates the provision of a centre block which fits within said aperture at the outer face thereof which block may be provided with one or more radial slots which extend from its periphery each of said radial slots being for the reception of a further wire or rod.

The invention also includes the combination with an anchoring guide as above described of means for securing each wire or rod in a stressed condition.

The invention further includes anchoring means which secure in the stressed condition reinforcing wires or rods in the construction of prestressed concrete structures, comprising an anchorage guide having an aperture therethrough, a plurality of bores the axis of each bore being at an angle to the axis of the aperture, one end of each bore entering said aperture the other end emerging from the outer face of the guide, said face being provided with a recessed portion around each bore, the plane of the base of each recess being at right angles to the axis of its associated bore, and each bore having associated therewith a slot so that each of a plurality of wires or rods which pass through said aperture may be moved through a slot to lie in a bore for securing means to be applied thereto, a centre block fitting within the said aperture at the outer face thereof, and a plurality of securing means located in bushes for individually stressing the said wires or rods.

Figure 4:
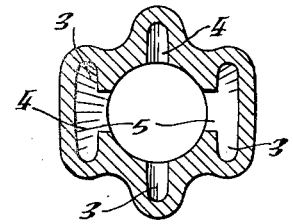
Figure 2:
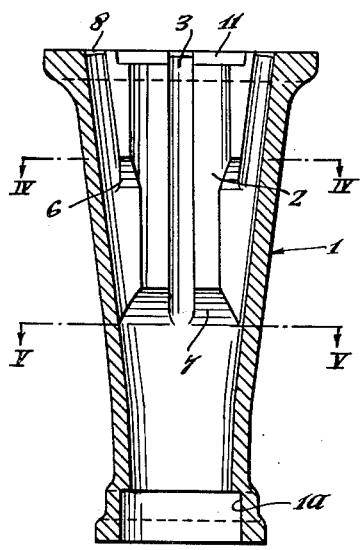
Figure 3:
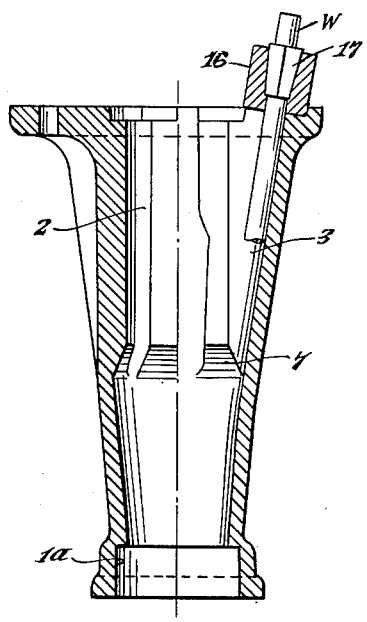
Figure 5:
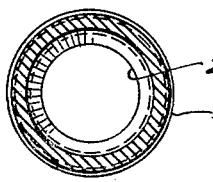
Figure 6:
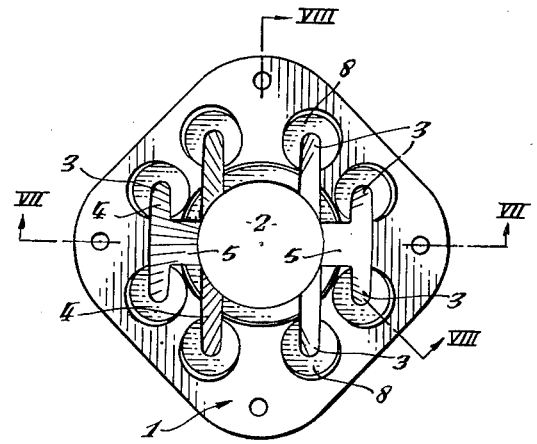
Figure 7:
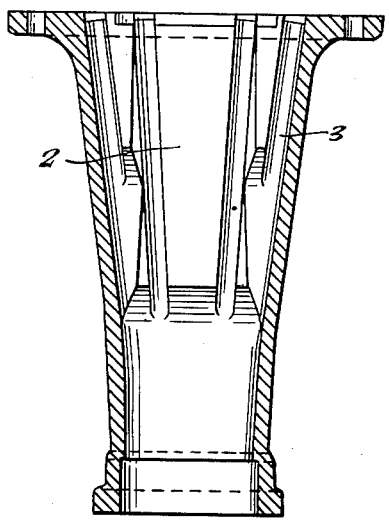
Figure 8:
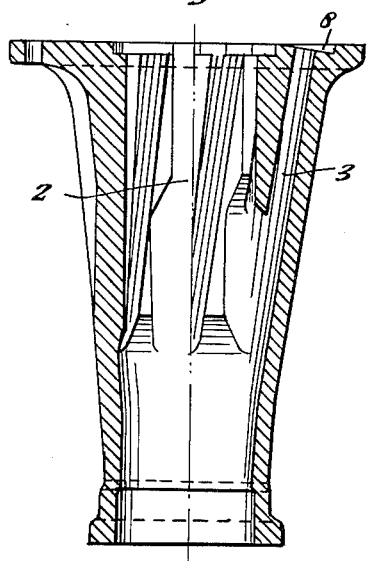
Figure 9:
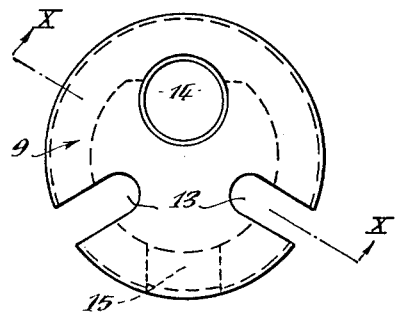
Figure 10:
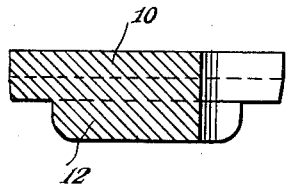
Figure 11:
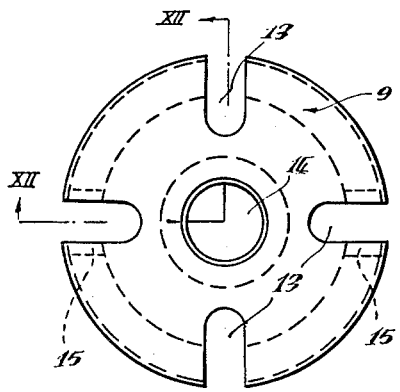
Figure 12:
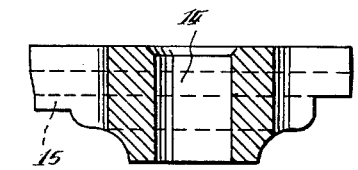
Figure 13:
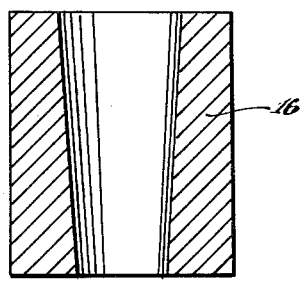

In order that the invention may be readily carried into effect two embodiments will now be described as examples only with reference to the accompanying drawings, in which:

FIG. 1 illustrates a plan view of an anchorage guide constructed according to the invention;
FIG. 2 is a cross section on the line II—II of FIG. 1;
FIG. 3 is a cross section on the line III—III of FIG. 1 and showing one end portion of a wire and the means for anchoring same in one of the several bores of the anchorage guide;
FIG. 4 is a cross section on the line IV—IV of FIG. 2;
FIG. 5 is a cross section on the line V—V of FIG. 2;
FIG. 6 is a plan view of a modified form of anchorage guide constructed according to the invention;
FIG. 7 is a section on the line VII—VII of FIG. 6;
FIG. 8 is a section on the line VIII—VIII of FIG. 6;
FIG. 9 is a plan view of a centre block for closing the central aperture of the embodiment shown in FIGS. 1 to 5;
FIG. 10 is a section on the lime X—X of FIG. 9;
FIG. 11 is a plan view of a centre block for closing the central aperture of the embodiment shown in FIGS. 6 to 8; and
FIG. 12 is a section on the line XII—XII of FIG. 11;
FIG. 13 is a sectional view of an internally tapered bush forming part of securing means for a wire or rod.

Referring now to the accompanying drawings and in particular to FIGS. 1 to 5, it will be seen that the anchorage guide 1 is tapered along its length and provided with a central aperture 2 which extends the length thereof. The tapered end of the anchorage guide 1 is provided with a recess 1a for the reception of a conduit which passes through the concrete structure to be prestressed and which encloses the prestressing wires or rods.

The anchorage guide 1 is also provided with six bores 3, the axis of each bore being at an angle to the axis of the central aperture but converging to meet at a point on the axis of the central aperture. Each of the said six bores 3 is open for its full diameter along one side which communicates with a slot 4 to an extent at least equal to the diameter of the bore and which places it in communication throughout its entire length with the main bore or central aperture 2 of the guide member. In substance it will be seen that each said bore or subsidiary bore 3 merely defines a rounded or generally cylindrical end wall of its associated slot 4 for engagement with the wire to be received therein. The slot 4 for two of the said bores, joins them to the central aperture 2, but as will be seen from FIG. 1 two further transverse slots 5 are provided which join the slots of the extreme left and right hand bores with the central aperture 2.

Where the bores 3 and the associated slots 4 emerge from the outer face of the anchorage guide 1 they are in parallel relation. This construction is chosen for ease in casting which would otherwise necessitate a complicated mould pattern. As will be seen from FIGS. 2 and 3, the internal splines are cut back at 6 and 7 to avoid feather edging.

The outer face of the anchorage guide is provided at 8 with a recessed portion around each bore. The plane of the base of each recess being at right angles to the axis of its associate bore. The purpose of these recesses 8 is to receive an internally tapered bush 16 (FIGURE 3) which houses the securing means for that particular rod or wire as will be later described.

Referring now to FIGS. 9 and 10 which show a centre block for use with the anchorage guide of FIGS. 1 to 5, the block 9 comprises a head portion 10 which fits within the recess 11 formed around the central aperture 2 and a shank portion 12 which fits within the central aperture 2. The centre block 9 is provided with two radial slots 13 and also with an opening 14 for the reception of grouting material or an additional wire or rod secured in the same manner as the wires or rods lying in the bores. The lower portion of the centre block is also provided with a nib 15 for locating the block in position within the central aperture 2. It will be appreciated that this nib 15 fits within either one of the two transverse slots 5 so that the radial slots 13 are correctly positioned.

FIG. 13 shows an internally tapered bush 16, eight of which will be used in conjunction with the embodiment above described. This internally tapered bush 16 is positioned as shown in FIGURE 3, so far as each of the six outer bores 3 is concerned, within one of the recesses 8 so the axis of each bush 16 lies coincident with the axis of its associated bore 3. This ensures that when the securing means 17 are placed in position within the internal taper of the bush 16 its restraining or holding force will be exerted axially of the wire W or rod which is being stressed.

The securing means may conveniently take the form of a split sleeve of the kind disclosed in the specification of the British Patent No. 775,743, of May 29, 1957, the said split sleeve being located and held within the internal taper bore of the bush 16.

Referring now to FIGS. 6 to 8 which show a modified form of anchorage guide according to the invention but designed to secure in position 12 wires or rods.

As in the previous embodiment there are provided a central aperture 2 and bores 3 the axis of each bore converging towards the axis of the central aperture 2. Again the bores 3 communicate with the central aperture 2 by the provision of slots 4 with additional transverse slots 5.

In this particular embodiment the centre block will take the form shown in FIGS. 11 and 12 in which the centre block 9 is provided with four radial slots 13 arranged at right angles to each other. This centre block 9 is provided with two nibs 15 on its underside, the said nibs being adapted to enter the transverse slots 5 so that the centre block is correctly positioned. The centre block is also provided with an opening 14 which in this embodiment is arranged co-axial with the aperture 2.

In operation it is simply a question of casting the concrete to be prestressed around the anchorage guide so that the outer face of the guide coincides with one face of the structure. Normally, the bunch of wires or rods are inserted prior to casting, but in the present case the bunch may be inserted afterwards through a suitable duct or conduit to emerge at the wider end of the anchorage guide.

With this embodiment it is not necessary to utilise a separate block within which the tensioning means may be mounted, but simply the rods or wires are individually opened out from the bunch and moved through the appropriate slot to lie in one of the bores 3. An internally tapered bush is then passed over the end of the rod or wire and a securing device then located within the tapered bore. This rod or wire is then individually tensioned by any suitable means such as the hydraulic jack of the kind disclosed in the specification of the prior British Patent No. 764,197. On removal of the hydraulic jack the rod or wire will then be held in its tensioned condition by the split tapered sleeve.

It may be desirable to locate all the rods and wires in position before any one is prestressed and after the six outer rods or wires have been positioned in their respective bores the centre block 9 is positioned to close the central aperture 2. The provision of the nib 15 will ensure that the radial slots 13 do not communicate with any of the slots 4 or the transverse slots 5 but are closed by the side walls of the central aperture 2. The purpose of the aperture 14 is for the reception of grouting material or alternatively an additional wire or rod may be passed through this aperture and secured in the same manner as the wires or rods lying in the bores.

It will be appreciated that the wires or rods lying within the radial slots 13 diverge only slightly from the axis of the central aperture 2 so that the provision of inclined recesses for reception of the bush 16 are not necessary.

The alternative anchorage guide shown in FIGS. 6 to 8 is used in conjunction with the central block shown in FIGS. 11 and 12 in the same manner as described for the previous embodiment. Again the provision of nibs 15 on the underside of block 9 ensures that the block is correctly located within the central aperture 2.

The anchorage means may be modified without departing from the scope of the invention, for example, any desired number of radial bores may be used and each bore may communicate with the central aperture by radial slots.

What I claim is:

1. An anchoring device for securing the free ends of generally parallel bunched wires comprising a generally tubular guide member having a main bore therethrough proportioned for free simultaneous reception of all of the free ends, said guide member being formed with a plurality of subsidiary bores angularly intersecting said main bore medially of its length and diverging from said main bore toward one end of said guide member, each said subsidiary bore communicating throughout its entire length with said main bore whereby certain of the wires initially disposed in said main bore may be displaced radially outwardly from the main bore into said respective subsidiary bores, internally tapered bushings respectively disposed in abutment with said member at the diverging ends of the respective subsidiary bores, the interior taper of each said bushing converging toward said guide member, and wedge means in each said tapered bushing for operative engagement with a wire extending through said bushing and its respectively associated subsidiary bore.

2. The combination of elements as defined in claim 1, including a central block disposed over the end of said main bore in axial abutment with said member, a bore through said block communicating with said main bore and in alignment therewith for reception of one of said wires, an internally tapered bushing disposed in axial abutment with said block on the remote side thereof from said member and in communication with said bore through the block, and wedge means in said tapered bushing for frictional engagement with a wire extending through said bushing.

3. The combination of claim 2, in which the said wedge means each comprise a split tapered sleeve.

4. The combination of a plurality of bunched and generally parallel wires having substantially free ends, and an anchoring device secured on said ends, said device comprising a generally tubular guide member having a main bore therethrough proportioned for free simultaneous reception of all of said free ends, said free ends extending completely through and projecting beyond said member, said guide member being formed with a plurality of subsidiary bores angularly intersecting said main bore and diverging therefrom toward said free ends, each said bore communicating throughout its length with said main bore, certain of said wires being disposed in relatively diverging relation to each other within their respective subsidiary bores, internally tapered bushings respectively disposed around said wires and in abutment with the end of said member adjoining said free ends of the wires, said internally tapered bushings converging toward said guide member, and wedge means in each said bushing in wedging engagement between it and the wire disposed through said bushing.

5. The combination defined in claim 4, wherein the end of said guide member directed toward said free ends of the wires is provided with recesses around the diverging ends of the subsidiary bores, the inner end of each said recess being in a radial plane relative to its subsidiary bore, and the bushing associated with each said bore being received in said recess and in abutment with its said inner end.

6. The combination of elements defined in claim 4, including a central block disposed across the end of said main bore, in abutting engagement with the end of said guide member directed toward said free end of the wires, a bore through said block for reception of one of said wires, an internally tapered bushing disposed about said last-mentioned wire and abutting against said block on the side of said block remote from said guide member, and wedge means in frictional engagement with said last-mentioned wire.

References Cited in the file of this patent

UNITED STATES PATENTS

| | | |
|---|---|---|
| 100,976 | Chamberlain | Mar. 22, 1870 |
| 1,694,683 | Cole | Dec. 11, 1928 |
| 1,758,312 | De Right | May 13, 1930 |
| 2,107,488 | Maier | Feb. 8, 1938 |

FOREIGN PATENTS

| | | |
|---|---|---|
| 775,744 | Great Britain | May 29, 1957 |